US010085299B2

(12) United States Patent
Luft et al.

(10) Patent No.: US 10,085,299 B2
(45) Date of Patent: Sep. 25, 2018

(54) DEVICE TO-DEVICE DISCOVERY INFORMATION ENCRYPTION

(71) Applicant: Intel Corporation, Santa Clara, CA (US)

(72) Inventors: Achim Luft, Braunschweig (DE); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 184 days.

(21) Appl. No.: 14/779,260

(22) PCT Filed: Jun. 6, 2014

(86) PCT No.: PCT/US2014/041393
§ 371 (c)(1),
(2) Date: Sep. 22, 2015

(87) PCT Pub. No.: WO2014/197851
PCT Pub. Date: Dec. 11, 2014

(65) Prior Publication Data
US 2016/0044006 A1 Feb. 11, 2016

Related U.S. Application Data

(60) Provisional application No. 61/832,644, filed on Jun. 7, 2013.

(51) Int. Cl.
*G06F 21/00* (2013.01)
*H04L 29/06* (2006.01)
(Continued)

(52) U.S. Cl.
CPC ........... *H04W 76/28* (2018.02); *H04L 5/0032* (2013.01); *H04L 5/0035* (2013.01);
(Continued)

(58) Field of Classification Search
CPC ............. H04W 76/048; H04W 72/005; H04W 68/005; H04W 48/16; H04W 8/005;
(Continued)

(56) References Cited

U.S. PATENT DOCUMENTS

2001/0023416 A1\* 9/2001 Hosokawa ............. G06Q 30/04
705/51
2007/0171910 A1 7/2007 Kumar
(Continued)

FOREIGN PATENT DOCUMENTS

CN 101047495 A 10/2007
CN 101420306 A 4/2009
(Continued)

OTHER PUBLICATIONS

International Search Report and Written Opinion dated Sep. 30, 2014 from International Application No. PCT/US2014/41393.
(Continued)

*Primary Examiner* — Lisa C Lewis
(74) *Attorney, Agent, or Firm* — Schwabe, Williamson & Wyatt, P.C.

(57) ABSTRACT

In embodiments, apparatuses, methods, and storage media may be described for secure broadcast of discovery information of a discoverable user equipment (UE) in a device-to-device (D2D) network. Specifically, the discovery information may be encrypted with a first encryption key, and then the result of that encryption may be re-encrypted with a second encryption key. The dual-encrypted discovery information may then be broadcast in a cell. Upon reception of the dual-encrypted discovery information, a discovering UE with the appropriate decryption keys may decrypt the message to identify the discovery information. Based on the decrypted discovery information, the discovering UE may identify the presence of the discoverable UE.

13 Claims, 7 Drawing Sheets

(51) Int. Cl.

| | | |
|---|---|---|
| *H04W 76/28* | (2018.01) | |
| *H04W 36/22* | (2009.01) | |
| *H04W 28/02* | (2009.01) | |
| *H04N 21/24* | (2011.01) | |
| *H04W 28/08* | (2009.01) | |
| *H04L 5/00* | (2006.01) | |
| *H04L 5/14* | (2006.01) | |
| *H04W 72/04* | (2009.01) | |
| *H04W 52/02* | (2009.01) | |
| *H04W 36/30* | (2009.01) | |
| *H04N 21/262* | (2011.01) | |
| *H04W 36/24* | (2009.01) | |
| *H04W 8/00* | (2009.01) | |
| *H04W 12/04* | (2009.01) | |
| *H04W 48/16* | (2009.01) | |
| *H04W 68/00* | (2009.01) | |
| *H04W 72/00* | (2009.01) | |
| *H04W 4/70* | (2018.01) | |
| *H04W 4/90* | (2018.01) | |
| *H04W 36/14* | (2009.01) | |
| *H04W 36/36* | (2009.01) | |
| *H04W 84/12* | (2009.01) | |
| *H04W 92/18* | (2009.01) | |
| *H04W 4/00* | (2018.01) | |
| *H04W 4/22* | (2009.01) | |

(52) U.S. Cl.
CPC .............. *H04L 5/0055* (2013.01); *H04L 5/14* (2013.01); *H04L 63/0442* (2013.01); *H04N 21/24* (2013.01); *H04N 21/2401* (2013.01); *H04N 21/26208* (2013.01); *H04W 8/005* (2013.01); *H04W 12/04* (2013.01); *H04W 28/0289* (2013.01); *H04W 28/085* (2013.01); *H04W 36/22* (2013.01); *H04W 36/24* (2013.01); *H04W 36/30* (2013.01); *H04W 48/16* (2013.01); *H04W 52/0212* (2013.01); *H04W 68/005* (2013.01); *H04W 72/005* (2013.01); *H04W 72/0406* (2013.01); *H04W 4/005* (2013.01); *H04W 4/22* (2013.01); *H04W 4/70* (2018.02); *H04W 4/90* (2018.02); *H04W 28/08* (2013.01); *H04W 36/14* (2013.01); *H04W 36/36* (2013.01); *H04W 84/12* (2013.01); *H04W 92/18* (2013.01); *Y02B 60/50* (2013.01); *Y02D 70/00* (2018.01)

(58) Field of Classification Search
CPC ..... H04W 12/04; H04W 36/24; H04W 36/30; H04W 28/085; H04W 72/0406; H04W 52/0212; H04W 28/0289; H04W 36/22; H04W 4/005; H04W 4/22; H04W 92/18; H04W 36/14; H04W 36/36; H04W 84/12; H04W 28/08; H04L 5/0035; H04L 5/0055; H04L 63/0442; H04L 5/14; H04L 5/0032; H04N 21/24; H04N 21/2401; H04N 21/26208; Y02B 60/50

See application file for complete search history.

(56) References Cited

U.S. PATENT DOCUMENTS

| | | | |
|---|---|---|---|
| 2008/0195548 A1* | 8/2008 | Chu ........................ | G06F 21/10 705/59 |
| 2010/0299534 A1 | 11/2010 | Shim et al. | |
| 2012/0204224 A1 | 8/2012 | Wang et al. | |
| 2013/0251216 A1* | 9/2013 | Smowton .............. | H04L 9/3231 382/118 |
| 2013/0316727 A1* | 11/2013 | Edge ....................... | H04W 4/02 455/456.1 |
| 2014/0213250 A1* | 7/2014 | Baek ................... | H04W 76/023 455/434 |
| 2016/0309401 A1* | 10/2016 | Baek ..................... | H04W 48/16 |

FOREIGN PATENT DOCUMENTS

| | | |
|---|---|---|
| CN | 102740286 A | 10/2012 |
| WO | WO 2013/066011 A1 | 5/2013 |

OTHER PUBLICATIONS

Extended European Search Report dated Jan. 9, 2017 from European Patent Application No. 14807526.0, 11 pages.

Sarkar, "Efficient Tweakable Enciphering Schemes From (Block-Wise) Universal Hash Functions," IEEE Transactions on Information Theory, vol. 55, No. 10, Oct. 2009, pp. 4749-4760.

China Mobile, "ProSe identity privacy," 3GPP TSG SA WG3 (Security) Meeting #71, S3-130385, Agenda Item: 7.13, Apr. 8-12, 2013, Valencia, Spain, 2 pages.

Liu et al., "Toward Efficient Over-encryption in Outsourced Databases Using Secret Sharing," New Technologies, Mobility and Security, 2009, NTMS '08, Nov. 5, 2008, IEEE, Piscataway, NJ, USA, 5 pages.

Shikfa et al., "Privacy in Content-Based Opportunistic Networks," 2009 International Conference on Advanced Information Networking and Applications Workshops, May 26, 2009, IEEE Computer Society, Piscataway, NJ, USA, pp. 832-837.

3GPP, "Technical Specification Group Services and System Aspects; Feasibility study for Proximity Servies (ProSe) (Release 12)," 3GPP TR 22.803 V12.1.0 (Mar. 2013), Mar. 15, 2013, Lte Advanced, 45 pages.

China Mobile, "ProSe identity privacy," 3GPP TSG SA WG3 (Security) Meeting #71, S3-130385, Agenda Item, 7.13, Apr. 8-12, 2013; Valencia, Spain, 2 pages.

Palash Sarkar, "Efficient Tweakable Enciphering Schemes From (Block-Wise) Univeral Hash Functions," IEEE Transactions on Information Therory, Vol. 55, No. 10, October 2009, pp. 4749-4760.

* cited by examiner

DEVICE TO-DEVICE DISCOVERY INFORMATION ENCRYPTION

CROSS REFERENCE TO RELATED APPLICATIONS

The present application is a national phase entry under 35 U.S.C. § 371 of International Application No. PCT/US2014/041393, filed Jun. 6, 2014, entitled "DEVICE-TO-DEVICE DISCOVERY INFORMATION ENCRYPTION", which claims priority to U.S. Provisional Patent Application No. 61/832,644, filed Jun. 7, 2013, entitled "Advanced Wireless Communication Systems and Techniques," the entire disclosures of which are hereby incorporated by reference in their entireties.

FIELD

Embodiments of the present invention relate generally to the technical field of encryption of user discovery information in device-to-device (D2D) transmission.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

In some wireless networks, it may be useful to allow direct D2D communication between two or more wireless devices that are in proximity with one another. For example, third generation partnership project (3GPP) standards have recently incorporated a D2D service called proximity services (ProSe).

In some D2D service networks, it may be necessary for a mobile device such as a 3GPP user equipment (UE) to broadcast discovery information that is used to identify the UE or a user of the UE. However, broadcasting this discovery information may be undesirable in some situations, for example, because it may make the UE broadcasting the discovery information publicly discoverable to anyone within range of the UE.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 6-A illustrates a high level process for encrypting D2D discovery information, in accordance with various embodiments.

FIG. 6-B illustrates a high level process for decrypting encrypted D2D discovery information, in accordance with various embodiments.

DETAILED DESCRIPTION

In embodiments, apparatuses, methods, and storage media may be described for secure broadcast of discovery information such as a user identifier (ID) related to a discoverable UE in a D2D network. Specifically, the discovery information of the discoverable UE may be encrypted with a first encryption key, and then the result of that encryption may be re-encrypted with a second encryption key. The double-encrypted discovery information may then be broadcast in a cell. Upon reception of the double-encrypted discovery information, a discovering UE with the appropriate decryption keys may decrypt the message to identify the previously encrypted discovery information. Based on the decrypted discovery information, the discovering UE may identify the presence and identity of the discoverable UE.

In embodiments, the discovery information of the UE may be encrypted via an asymmetric encryption algorithm such as a public key/private key encryption algorithm. The discovery information may be related to discovery permissions granted on a ProSe ID level, user level, application level, device level, etc. A user of the discoverable UE may choose which of his IDs is discoverable by whom and with what application.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
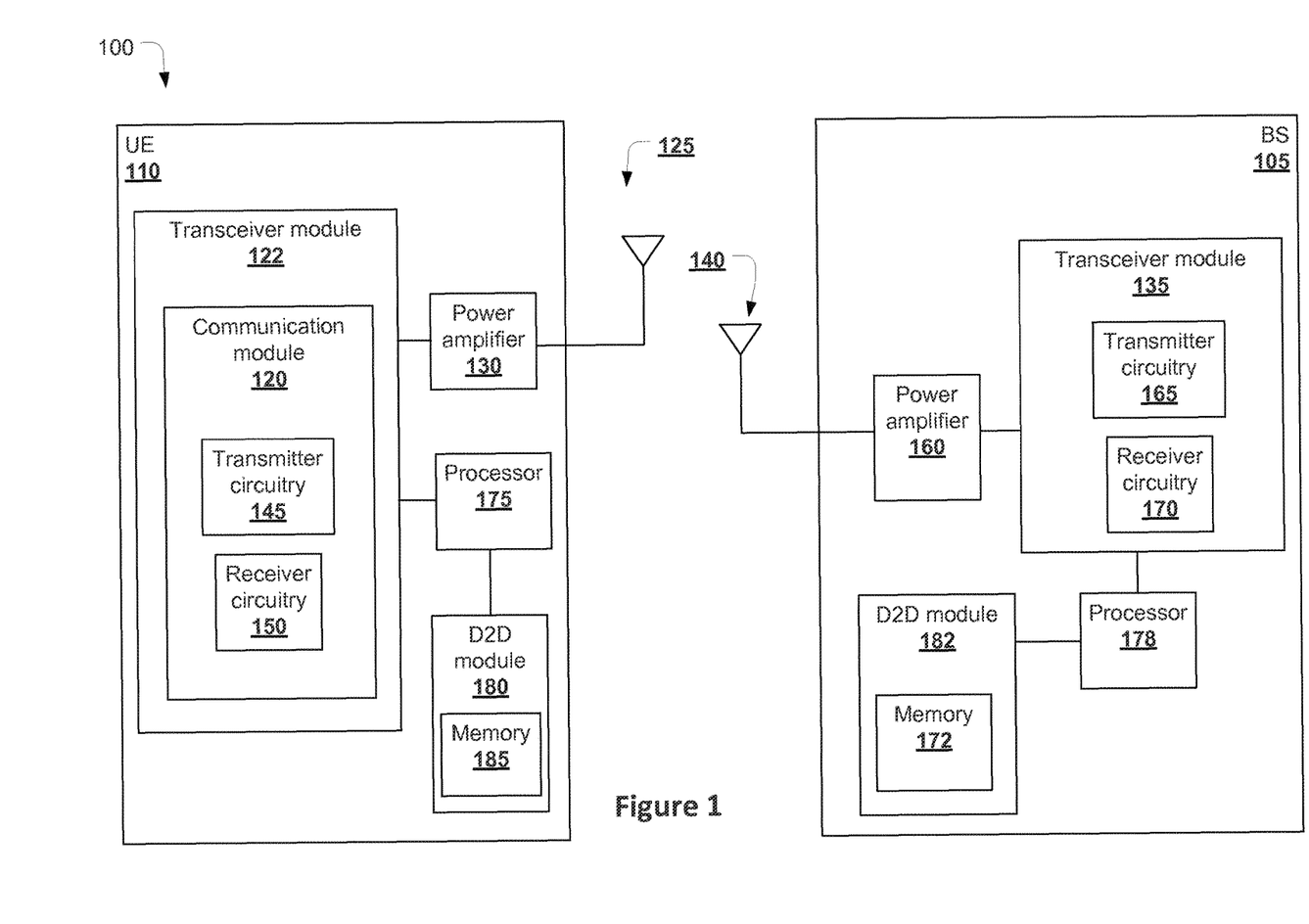
FIG. 1 schematically illustrates an example of a network comprising a user equipment (UE) and a base station (BS), in accordance with various embodiments.

FIG. 1 schematically illustrates an example wireless network 100 (hereinafter "network 100") in accordance with various embodiments. The network 100 may include a UE such as UE 110 coupled with a BS 105. In some embodiments, the network 100 may be an access network of a third generation partnership project (3GPP) long term evolution (LTE) network such as evolved universal terrestrial radio access network (E-UTRAN). In these embodiments the BS 105 may be a 3GPP-defined eNodeB (eNB, also referred to as an evolved NodeB) configured to wirelessly communicate with the UE 110 using a wireless protocol such as the 3GPP LTE wireless protocol.

As shown in FIG. 1, the UE 110 may include a transceiver module 122, which may also be referred to as a multi-mode transceiver chip. The transceiver module 122 may be configured to transmit and receive wireless signals. Specifically, the transceiver module 122 may be coupled with one or more of a plurality of antennas 125 of the UE 110 for communicating wirelessly with other components of the network 100, e.g., BS 105 or another UE. The antennas 125 may be powered by a power amplifier 130 which may be a component of the transceiver module 122, or coupled with the transceiver module 122 and generally between the transceiver module 122 and the antennas 125 as shown in FIG. 1. In one embodiment, the power amplifier 130 may provide the power for all transmissions on the antennas 125. In other embodiments, there may be multiple power amplifiers on the UE 110. The use of multiple antennas 125 may allow for the UE 110 to use transmit diversity techniques such as spatial orthogonal resource transmit diversity (SORTD), multiple-input multiple-output (MIMO), or full-dimension MIMO (FD-MIMO).

In certain embodiments the transceiver module 122 may include a communication module 120, which may be referred to as a broadband module. Communication module 120 may contain both transmitter circuitry 145 configured to cause the antennas 125 to transmit one or more signals from the UE 110, and receiver circuitry 150 configured to cause the antennas 125 to receive one or more signals at the UE 110. In other embodiments, the communication module 120 may be implemented in separate chips or modules, for example, one chip including the receiver circuitry 150 and another chip including the transmitter circuitry 145. In some embodiments the signals may be cellular signals transmitted to or received from a 3GPP eNB such as BS 105. In some embodiments, the UE 110 may include a processor 175 coupled to the transceiver module 122. The processor 175 may further be coupled with a D2D module 180, which may include, or otherwise be coupled with memory 185. In embodiments, the processor 175 and/or the D2D module 180 may be configured to perform one or more tasks related to D2D communication of the UE 110, as will be explained in further detail below. The memory 185 may be configured to store one or more encryption keys, user IDs, or other discovery information of the UE 110 or the user of the UE 110, as will be explained in further detail below. In some embodiments, the processor 175 or the transceiver module 122 may include the D2D module 180 and/or the memory 185.

Similarly to the UE 110, the BS 105 may include a transceiver module 135. The transceiver module 135 may be further coupled with one or more of a plurality of antennas 140 of BS 105 for communicating wirelessly with other components of the network 100, e.g., UE 110. The antennas 140 may be powered by a power amplifier 160 which may be a component of the transceiver module 135, or may be a separate component of the BS 105, and generally positioned between the transceiver module 135 and the antennas 140 as shown in FIG. 1. In one embodiment, the power amplifier 160 may provide the power for all transmissions on the antennas 140. In other embodiments, there may be multiple power amplifiers on the BS 105. The use of multiple antennas 140 may allow for the BS 105 to use transmit diversity techniques such as SORTD, MIMO, or FD-MIMO. In certain embodiments the transceiver module 135 may contain both transmitter circuitry 165 configured to cause the antennas 140 to transmit one or more signals from the BS 105, and receiver circuitry 170 configured to cause the antennas 140 to receive one or more signals at the BS 105. In other embodiments, the transceiver module 135 may be replaced by transmitter circuitry 165 and receiver circuitry 170 which are separate from one another (not shown). In some embodiments, though not shown, the transceiver module 135 may include a communication module such as communication module 120 that includes the receiver circuitry 170 and the transmitter circuitry 165. In some embodiments, the transceiver module 135 may be coupled with a processor 178 configured to perform one or more actions related to discovery information of a UE used in D2D transmissions. Specifically, the processor 178 may include, or otherwise be coupled with, a D2D module 182 which may include memory 172. The memory may include information related to discovery information, public keys, and/or private keys of different UEs and the wireless network. The D2D module 182, and/or the processor 178, may be configured to identify and/or encrypt one or more of the user IDs, as will be further explained below.

Figure 2:
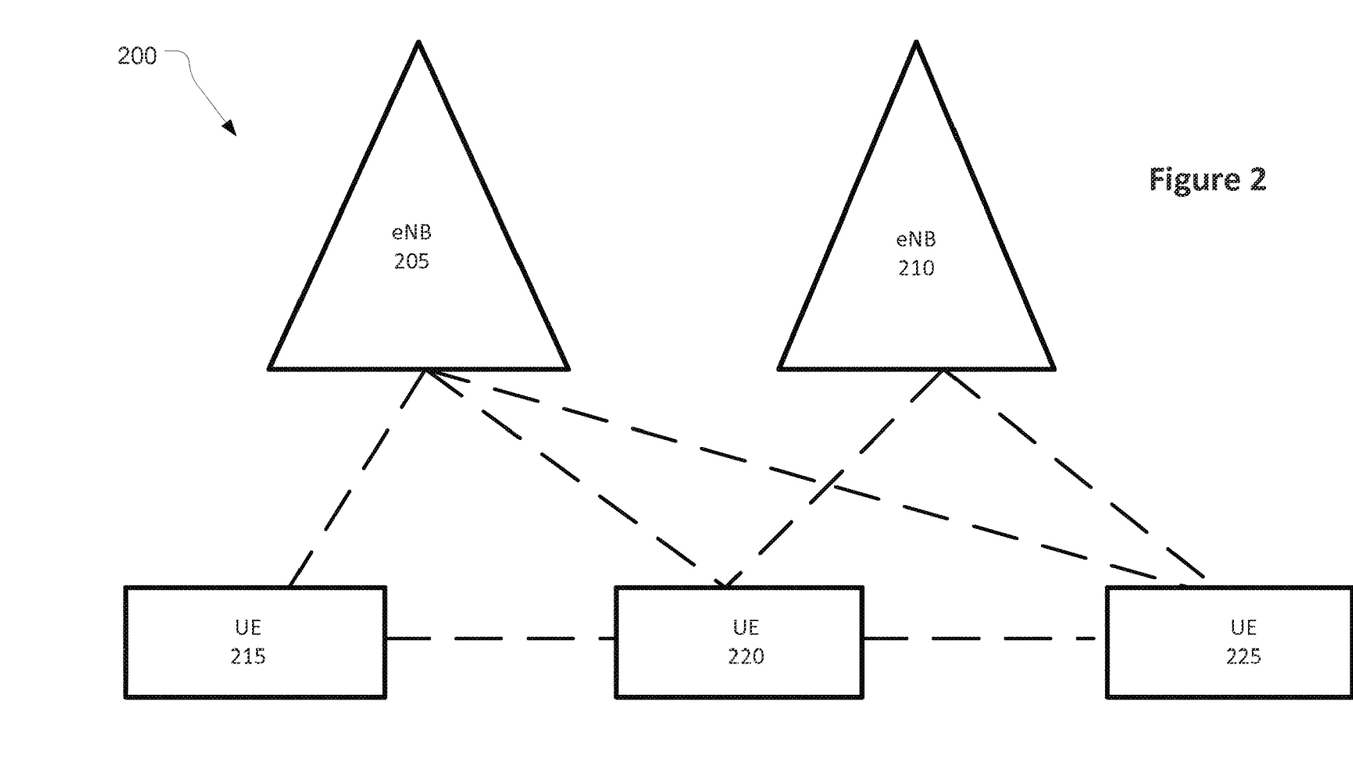
FIG. 2 illustrates a high level example of a wireless network, in accordance with various embodiments.

FIG. 2 depicts an example of a wireless network 200. The wireless network may include a plurality of eNBs, such as eNBs 205 and 210, which may be similar to BS 105 of FIG. 1. In embodiments, the eNBs 205 and 210 may be in separate cells of the wireless network 200, or the same cell of the wireless network 200. The wireless network 200 may also include a plurality of UEs 215, 220, and 225, which may be similar to UE 110 of FIG. 1. In embodiments, the UEs 215, 220, 225 may be configured to send and/or receive signals from one or both of eNBs 205 and 210.

Additionally, the wireless network 200 may be capable of functioning as a D2D network, such as a ProSe network as standardized by various 3GPP specifications. Specifically, one or more of the UEs, such as UE 215, may be able to transmit a direct message to another of the UEs such as UE 220. In some embodiments, a UE such as UE 220 may be able to transmit direct messages to a plurality of other UEs, such as UEs 215 and UE 225.

In order to transmit direct messages to one another, one of the UEs (a discovering UE) may need to identify the presence of another of the UEs (a discoverable UE) within the same wireless network, wireless cell, transmission radius, or proximity as the discovering UE. In some embodiments, a D2D network may have one or more requirements or restrictions related to device discovery. For example, based on operator policy and/or user choice, the proximity of two D2D-enabled UEs may be determinable by the network, or by one or more of the UEs. For example, a discovering UE may be configured to identify a discoverable UE in a D2D network using direct radio signals from the discoverable UE, or by a signal received from the operator of the network. Additionally, a discovering D2D-enabled UE may be able to determine whether or not a discoverable D2D-enabled UE is of interest to it. A D2D-enabled UE may be considered of interest to a discovering D2D-enabled UE if the proximity of the discoverable D2D-enabled UE needs to be known by one or more authorized applications of the discovering D2D-enabled UE. Additionally, subject to user and operator settings, a D2D-enabled UE may only be discoverable by other D2D-enabled UEs that are explicitly permitted by the D2D settings of the discoverable D2D-enabled UE. Additionally, in some embodiments, the different D2D-enabled UEs may be served by the same or different public land mobile network (PLMN). The above described conditions may also apply when one or both of the D2D-enabled UEs involved in D2D discovery are roaming in the same visited PLMN (VPLMN). Additionally, a D2D communication network may support the simultaneous operation of a large number of applications on a D2D-enabled UE, while ensuring that the wireless network 200, or eNBs 205 or 210, provide D2D discovery proximity information only to applications that are authorized by the user or the operator of the wireless network 200. Finally, the D2D network may allow both granting and revocation of discovery permissions.

However, in some embodiments it may be undesirable for a discovery information such as user ID of a discoverable UE such as UE 220 to be widely known. Specifically, broadcasting a user ID of a discoverable UE in a proximity of a discovering UE may provide both location and identification information of the user of the discoverable UE to the discovering UE and any other D2D UEs in the area. For example, broadcasting both the location and identification information may generate a risk of identity theft, a safety risk, or another risk to the user of the broadcasting UE.

Figure 3:
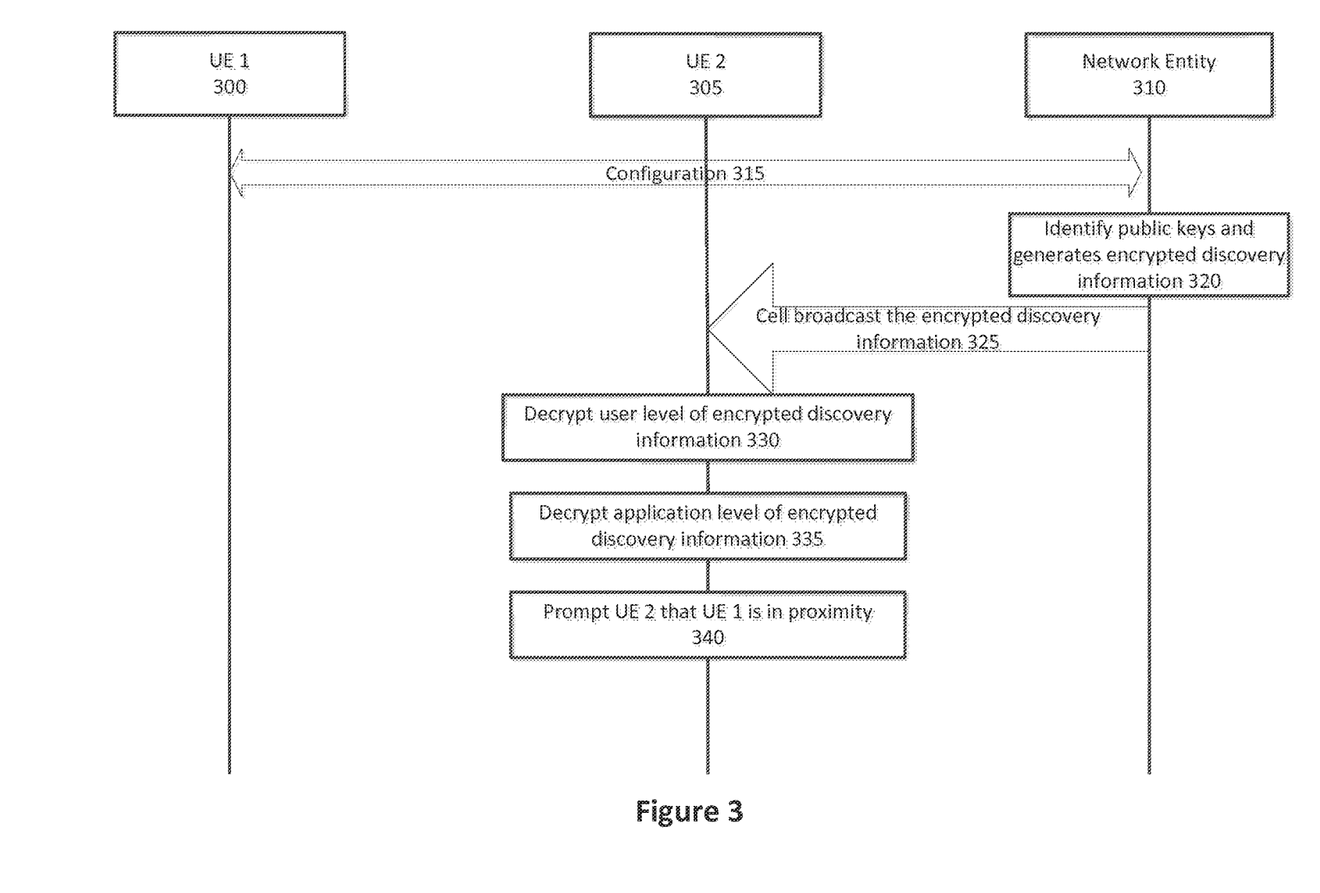
FIG. 3 illustrates an example process of encrypting D2D discovery information, in accordance with various embodiments.
Figure 4:
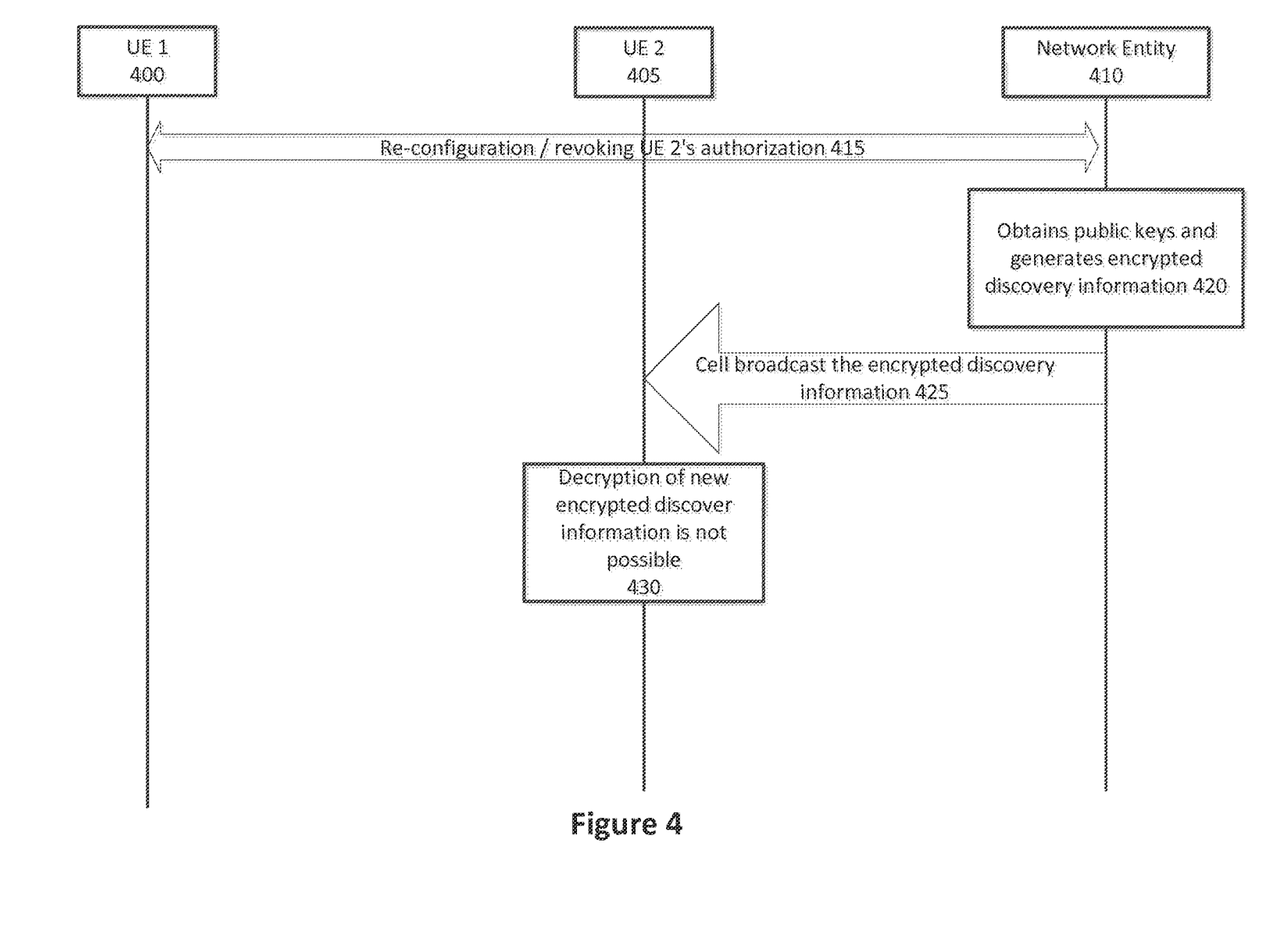
FIG. 4 illustrates another example process of encrypting D2D discovery information, in accordance with various embodiments.
Figure 5:
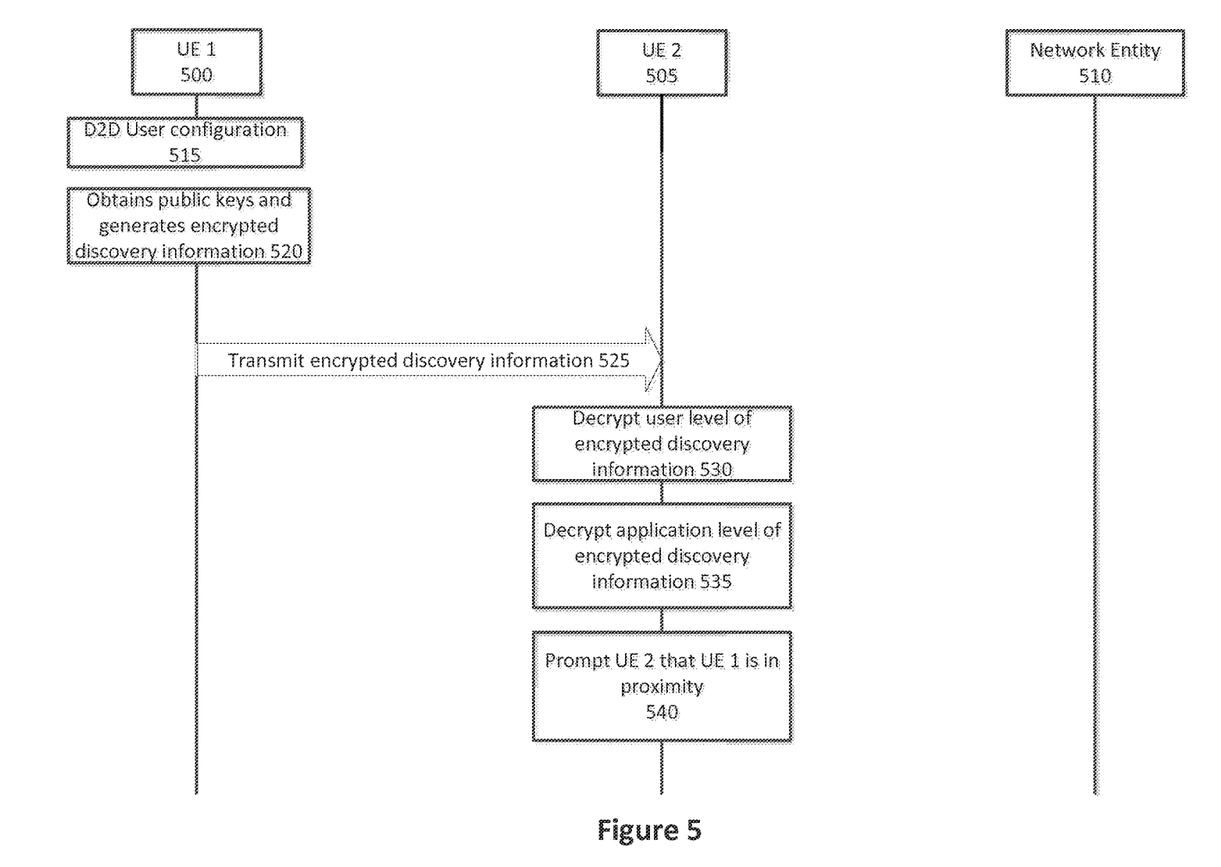
FIG. 5 illustrates another example process of encrypting D2D discovery information, in accordance with various embodiments.

FIGS. 3-5 illustrate different embodiments for reducing, minimizing, or eliminating the risk to the user of the broadcasting discoverable UE. Specifically, it may be assumed that there exists an entity with a user interface where a user may configure one or more D2D settings related to the user and/or the user's UE. For example, the user may be able to configure the D2D settings using an interface of the UE such as a touchscreen or keyboard, a computing device able to communicate the settings to the UE, or some other type of input device. In embodiments, the entity may be implemented as a network interface, for example, as a web user interface, or in the UE itself as a D2D configuration application.

The settings may include a list of other users or UEs that are allowed to discover the discoverable UE. The settings may also include a list of applications that are D2D enabled, i.e., able to communicate using D2D transmissions. The applications may include, for example, social applications, gaming applications, or other applications.

Based on the settings, the D2D UE may then broadcast discovery information such as a user ID of the user, a ProSe ID of the device, a location of the device, information related to an application on the device, or other discovery information. In embodiments, to preserve privacy or minimize risk to the user of the discoverable UE, the discovery information may be encrypted. Specifically, the discovery information may be encrypted using asymmetric cryptographic techniques such as a public/private key infrastructure. Generally, in asymmetric cryptography, each UE may have a pair of keys associated with it. The UE may have a public key, which may be used to encrypt a message, and a private key, which may be used to decrypt the encrypted message. The public key may be made publicly available, for example, by storing the public key in a public key server. If a discoverable UE wants to transmit encrypted discovery information such that it is readable by a discovering UE, the discovery information may be encrypted with a public key that corresponds to the private key related to the discovering UE. Upon receipt of the encrypted user ID, the discovering UE may decrypt the discovery information with its private key.

In some embodiments, it may be desirable for a user of the discoverable UE to authorize both other users and applications to discover the discoverable UE. In order to do so, the discovery information may first be encrypted with the public keys of the authorized applications, and the outcome of this encryption may then be re-encrypted with the public keys of the authorized users, or vice versa. In some embodiments, the amount of possible users of the D2D system may be much higher than the amount of available D2D applications being used. Therefore, in some embodiments it may be beneficial to first encrypt the discovery information of the discoverable UE with the public keys for the authorized applications, and then re-encrypt the outcome of the first encryption with the public keys of the authorized users.

This double encrypted message may then be broadcast either by the discoverable UE (direct discovery), or an entity of the network such as eNB 205 or 210 (evolved packet system (EPS) based discovery). A discovering UE that is in possession of the private key corresponding to the public key used to encrypt the discovery information may then be able to decrypt the first level of the received encrypted message, and then transfer the message to the authorized application to further decrypt the second level of the message and identify the discovery information.

In some embodiments, the encrypted discovery information may be directly transmitted to the discovering UE, rather than broadcasting or multicasting the encrypted discovery information. In this embodiment, the network may be attempting to determine the proximity of two or more UEs, and so the network may transmit encrypted discovery information to each of the UEs and ask the UEs to provide an indication of whether they are able to identify one another in the cell or within proximity of each other. In such a dedicated communication, existing user plane security may be used, and the user-level encryption may be optional. However, application-level encryption may still be used to ensure that only authorized applications are able to read the D2D discovery information.

FIG. 3 depicts one example of a discovery process using the encryption algorithm described above. Specifically, a first UE 300 and a second UE 305 may be in proximity of one another. UEs 300 and 305 may be similar, for example, to UE 110 of FIG. 1. The UEs 300 and 305 may also be communicatively coupled with a network entity 310, for example, an eNB such as eNBs 205 or 210. In other embodiments, network entity 310 may be a D2D server, core network component of the network (e.g., a ProSe function or other component in an Evolved Packet Core (EPC)), or some other network entity. In some embodiments, the operations attributed to the network entity 310 may be distributed through one or more entities distributed throughout a network.

In the example of FIG. 3, the user of UE 300 may be setting up his or her personal configuration of the D2D service. The user of UE 300 may also be a user of the social network that may be accessed via a web application or via mobile applications. In this embodiment, the user of UE 300 may authorize the user of UE 305 to access his or her D2D discovery information such as his or her user ID or social network ID if UE 300 and UE 305 are in proximity with one another. These authorizations may be communicated from UE 300 to network entity 310 at 315.

The network entity 310 may identify the necessary public keys related to both the social network and the user of UE 305, and encrypt the discovery information of the user of UE 300 at 320. Specifically, the network entity may encrypt the discovery information using a first one of the public keys, for example, the public key associated with the user of the UE 305. Then, the network entity 310 may re-encrypt the output of the first encryption element with the public key related to the network application. As noted above, in some embodiments the encryption keys may be used in a different order. In some embodiments, the network entity 310 may already be in possession of the different public keys, for example, by storing them in memory 172 of BS 105. In other embodiments, the public keys may be stored on a D2D public key server that may be operated by the operator of the D2D network, network entity 310, or by a third-party provider. The network entity 310 may then broadcast the encrypted discovery information at 325. In some embodiments, the network entity 310 may broadcast the encrypted discovery information in whichever network or network cell UE 300 is physically located within or about to be physically located within.

If UE 305 is within proximity of UE 300, for example, in the same network or network cell as UE 300, UE 305 may receive the broadcast of the encrypted discovery information. UE 305 may identify, for example, based on a key ID in the broadcast message, that the UE 305 is able to decrypt the message with a corresponding private key related to UE 305. UE 305 may then decrypt the first level of the encrypted discovery information at 330, which may be for example the user-level encryption. This first level decryption may result in another encrypted message as described above with a key ID associated with a social network, and so the encrypted message may then be transferred to the identified social network application to decrypt with a private key related to the social network application at 335. The result of the second level decryption may be the discovery information of UE 300. Based on this discovery information, UE 305 may identify and/or prompt the user of UE 305 that UE 300 is within proximity of UE 305 at 340.

In some embodiments, the user of UE 300 may want to revoke the authorization for UE 305 to be able to identify UE 300. This process may be displayed in FIG. 4, which depicts UE 400, UE 405, and network entity 410 which may be respectively similar to UE 300, UE 305, and network entity 310. In embodiments, the user of UE 400 may reconfigure his or her D2D settings, for example, using one or more of the interfaces described above, at 415. The network entity 410 may generate new encrypted discovery information for UE 400 at 420. However, because the user of UE 400 revoked authorization for UE 405 to be able to identify UE 400, the encrypted discovery information may not be encrypted with the public key related to UE 405. This newly encrypted user ID may be broadcast at 425. UE 405 may receive the encrypted user ID, but because the discovery information was not encrypted with the public key related to UE 405, UE 405 may not have access to the private key necessary to decrypt the encrypted discovery information. Therefore, decryption of the encrypted discovery information of UE 400 may not be possible at 430.

As noted above, in some embodiments the D2D entity may not be a network entity, but may be an element of the discoverable UE. FIG. 5 depicts an example of the discovery process in such an embodiment. Specifically, FIG. 5 depicts UE 500, UE 505, and network entity 510, which may be respectively similar to UE 300, UE 305, and network entity 310. In embodiments, the user of UE 500 may configure the D2D settings of UE 500 at 515. Based on the settings UE 500 may identify the public keys related to the settings, i.e., the public keys related to discovering UEs, public keys related to applications, etc., and encrypt the discovery information of UE 500 at 520. UE 500 may then broadcast the encrypted discovery information at 525.

UE 505 may receive the transmitted encrypted discovery information, and identify, based on a key ID in the encrypted information, that the UE 505 has access to the necessary private key to decrypt the received encrypted message. As described above with respect to FIG. 3, UE 505 may first decrypt the first level, i.e., the user level, of the encrypted discovery information at 530, and then transfer the decrypted message to a D2D application. The D2D application may then further decrypt the message using a private key related to the D2D application at 535, and identify the discovery information of the UE 500. Based on the identified discovery information, UE 505 may identify and/or prompt the user of UE 505 that UE 500 is within proximity of UE 505 at 540.

Figure 6:
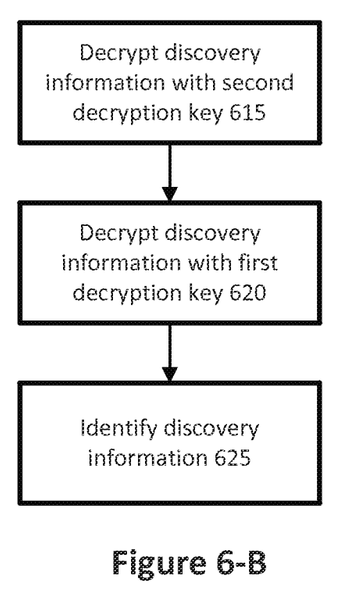

FIG. 6-A depicts a high level overview of the process for secure encryption in transmission of the discovery information of the discoverable UE in a D2D network. Specifically, a D2D module such as D2D modules 180 or 182 may first encrypt discovery information such as a user ID of a discoverable UE with a first encryption key at 600. As described above, the encryption key may be a public key and associated with a user, a device, an application, or some other public key. The D2D module may then encrypt the output of element 600 with a second encryption key at 605, which may be a different one of the public keys listed above. This dual encrypted discovery information may then be transmitted at 610.

FIG. 6-B depicts a high level overview of the process for reception and decryption of the discovery information by a discovering UE. Specifically, the encrypted discovery information may first be decrypted using a second decryption key at 615. Specifically the decryption key at 615 may be a private key that corresponds to the public key used at 605. The output of the first decryption process may then be further decrypted with the first decryption key at 620. Specifically, the decryption key used at 620 may be a private key that corresponds to the public key used at 600. Based on the decryption at 615 and 620, the user ID may be identified at 625.

Although the information described above as being encrypted is described as user ID information, in other embodiments additional or alternative discovery information may be encrypted as described above. In some embodiments, the dual level encryption may be performed on D2D transmissions that occur after the user discovery process. Additionally, although application-level encryption and user-level encryption are described above, in other embodiments alternative encryption keys may be used. For example, encryption related to a device ID, a serial number, a specific network, or one or more other encryption keys may be used.

Figure 7:
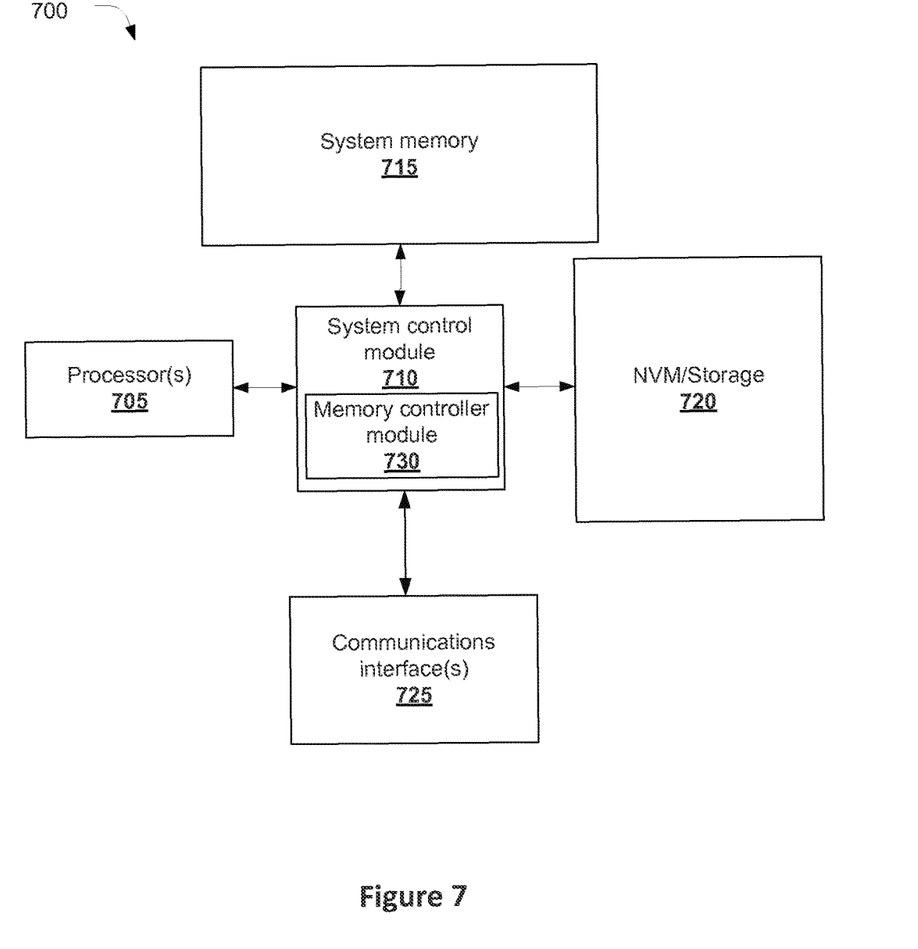
FIG. 7 schematically illustrates an example system that may be used to practice various embodiments described herein.

Embodiments of the present disclosure may be implemented into a system using any suitable hardware and/or software to configure as desired. FIG. 7 schematically illustrates an example system 700 that may be used to practice various embodiments described herein. FIG. 7 illustrates, for one embodiment, an example system 700 having one or more processor(s) 705, system control module 710 coupled to at least one of the processor(s) 705, system memory 715 coupled to system control module 710, non-volatile memory (NVM)/storage 720 coupled to system control module 710, and one or more communications interface(s) 725 coupled to system control module 710.

In some embodiments, the system 700 may be capable of functioning as the UE 110, 215, 220, or 225 as described herein. In other embodiments, the system 700 may be capable of functioning as one of BSs 105, or eNBs 205, or 210, as described herein. In some embodiments, the system 700 may include one or more computer-readable media (e.g., system memory or NVM/storage 720) having instructions and one or more processors (e.g., processor(s) 705) coupled with the one or more computer-readable media and configured to execute the instructions to implement a module to perform actions described herein.

System control module 710 for one embodiment may include any suitable interface controllers to provide for any suitable interface to at least one of the processor(s) 705 and/or to any suitable device or component in communication with system control module 710.

System control module 710 may include memory controller module 730 to provide an interface to system memory 715. The memory controller module 730 may be a hardware module, a software module, and/or a firmware module.

System memory 715 may be used to load and store data and/or instructions, for example, for system 700. System memory 715 for one embodiment may include any suitable volatile memory, such as suitable dynamic random-access memory (DRAM), for example. In some embodiments, the system memory 715 may include double data rate type four synchronous DRAM (DDR4 SDRAM).

System control module 710 for one embodiment may include one or more input/output (I/O) controller(s) to provide an interface to NVM/storage 720 and communications interface(s) 725.

The NVM/storage 720 may be used to store data and/or instructions, for example. NVM/storage 720 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 720 may include a storage resource physically part of a device on which the system 700 may be installed or it may be accessible by, but not necessarily a part of, the device. For example, the NVM/storage 720 may be accessed over a network via the communications interface(s) 725.

Communications interface(s) 725 may provide an interface for system 700 to communicate over one or more network(s) and/or with any other suitable device. The system 700 may wirelessly communicate with the one or more components of the wireless network in accordance with any of one or more wireless network standards and/or protocols. In some embodiments the communications interface(s) 725 may include the transceiver modules 122 or 135.

For one embodiment, at least one of the processor(s) 705 may be packaged together with logic for one or more controller(s) of system control module 710, e.g., memory controller module 730. For one embodiment, at least one of the processor(s) 705 may be packaged together with logic for one or more controllers of system control module 710 to form a System in Package (SiP). For one embodiment, at least one of the processor(s) 705 may be integrated on the same die with logic for one or more controller(s) of system control module 710. For one embodiment, at least one of the processor(s) 705 may be integrated on the same die with logic for one or more controller(s) of system control module 710 to form a System on Chip (SoC).

In some embodiments the processor(s) 705 may include or otherwise be coupled with one or more of a graphics processor (GPU) (not shown), a digital signal processor (DSP) (not shown), wireless modem (not shown), digital camera or multimedia circuitry (not shown), sensor circuitry (not shown), display circuitry (not shown), and/or global positioning satellite (GPS) circuitry (not shown).

In various embodiments, the system 700 may be, but is not limited to, a server, a workstation, a desktop computing device, or a mobile computing device (e.g., a laptop computing device, a handheld computing device, a tablet, a netbook, a smart phone, a gaming console, etc.). In various embodiments, the system 700 may have more or less components, and/or different architectures. For example, in some embodiments, the system 700 includes one or more of a camera, a keyboard, a liquid crystal display (LCD) screen (including touch screen displays), a non-volatile memory port, multiple antennas, a graphics chip, an application-specific integrated circuit (ASIC), and speakers.

EXAMPLES

A first example may include a user equipment (UE) comprising: a receiver module to receive an encrypted broadcast; and a processor coupled with the receiver module, the processor to: decrypt the encrypted broadcast with a first decryption key and a second decryption key, wherein the first and second decryption keys are each selected from a group of decryption keys consisting of a user-level decryption key, an application-level decryption key, and a device-level decryption key; and identify, based on the decrypted broadcast, device-to-device (D2D) discovery information associated with a remote UE.

Example 2 may include the UE of example 1, further comprising a transmitter coupled with the receiver, the transmitter to directly transmit a transmission to the remote UE based on the discovery information.

Example 3 may include the UE of example 1, wherein the receiver is to receive the encrypted broadcast from the remote UE.

Example 4 may include the UE of any of examples 1-3, wherein the first decryption key and the second decryption key are private keys that respectively correspond to public keys.

Example 5 may include the UE of any of examples 1-3, wherein the discovery information is a proximity services (ProSe) ID associated with the UE.

Example 6 may include the UE of example 5, wherein the discovery information is to allow the UE to identify and communicate with the remote UE in a ProSe network.

Example 7 may include the UE of any of examples 1-3, further comprising a display module coupled with the processor.

Example 8 may include the UE of any of examples 1-3, wherein the UE is a smartphone.

Example 9 may include a method comprising: encrypting, by a network entity of a wireless network, a discovery information related to a first user device with a first encryption key to generate a first encrypted data; encrypting, by the network entity, the first encrypted data with a second encryption key that is different than the first encrypted data to generate a second encrypted data; and facilitating, by the network entity, transmission of the second encrypted data to a second user device.

Example 10 may include the method of example 9, wherein the first and second encryption keys are selected from a group of encryption keys that consists of a user-level encryption key, an application-level encryption key, and a device-level encryption key.

Example 11 may include the method of example 9, wherein the first encryption key and the second encryption keys are public keys that respectively correspond to private keys associated with the second user device.

Example 12 may include the method of example 11, further comprising: identifying, by the network entity, an indication from the user; and re-encrypting, by the network entity, the discovery information with an encryption key that does not correspond to a private key associated with the second user device.

Example 13 may include the method of any of examples 9-12, wherein the discovery information is a proximity services (ProSe) ID of the user.

Example 14 may include the method of example 13, wherein the discovery information is to allow the second user device to identify and communicate with the first user device in a ProSe network that is different from the wireless network.

Example 15 may include one or more non-transitory computer-readable media comprising instructions to, upon execution of the instructions by one or more processors of a computing device, cause the computing device to: encrypt a user identifier (ID) associated with a first user equipment (UE) with a first encryption key to generate a first encrypted data; encrypt the first encrypted data with a second encryption key that is different than the first encrypted key to generate a second encrypted data; and transmit the second encrypted data to a second UE.

Example 16 may include the one or more non-transitory computer-readable media of example 15, wherein the first encryption key is associated with a user of the second UE or with an application of the second UE and the second encryption key is associated with the user of the second UE or with the application of the second UE.

Example 17 may include the one or more non-transitory computer-readable media of example 15, wherein the first encryption key or the second encryption key is a public key that corresponds to a private key associated with the second UE.

Example 18 may include the one or more non-transitory computer-readable media of example 17, wherein the instructions are further to re-encrypt, responsive to an indication from a user of the first UE, the user ID with a public key that does not correspond to a private key associated with the remote UE.

Example 19 may include the one or more non-transitory computer-readable media of any of examples 15-18, wherein the user ID is a proximity services (ProSe) ID associated with the first UE.

Example 20 may include the one or more non-transitory computer-readable media of any of examples 15-18, wherein the first UE is to identify, from a data transmission based on the transmission of the second encrypted data, the user ID.

Example 21 may include a method comprising: receiving, by a user equipment (UE), an encrypted broadcast; decrypting, by the UE, the encrypted broadcast with a first decryption key and a second decryption key, wherein the first and second decryption keys are each selected from a group of decryption keys consisting of a user-level decryption key, an application-level decryption key, and a device-level decryption key; and identifying, by the UE based on the decrypted broadcast, device-to-device (D2D) discovery information associated with a remote UE.

Example 22 may include the method of examples 21, further comprising directly transmitting, by the UE, a transmission to the remote UE based on the discovery information.

Example 23 may include the method of example 21, further comprising receiving, by the UE, the encrypted broadcast from the remote UE.

Example 24 may include the method of any of examples 21-23, wherein the first decryption key and the second decryption key are private keys that respectively correspond to public keys.

Example 25 may include the method of any of examples 21-23, wherein the discovery information is a proximity services (ProSe) ID associated with the UE.

Example 26 may include the method of example 25, wherein the discovery information is to allow the UE to identify and communicate with the remote UE in a ProSe network.

Example 27 may include one or more non-transitory computer-readable media comprising instructions to cause a computing device, upon execution of the instructions by one or more processors of the computing device, to perform the method of any of examples 21-26.

Example 28 may include an apparatus comprising means to perform the method of any of examples 21-26.

Example 29 may include one or more non-transitory computer-readable media comprising instructions to cause a computing device, upon execution of the instructions by one or more processors of the computing device, to perform the method of any of examples 9-14.

Example 30 may include an apparatus comprising means to perform the method of any of examples 9-14.

Example 31 may include a method comprising: encrypting, by a computing device, a user identifier (ID) associated with a first user equipment (UE) with a first encryption key to generate a first encrypted data; encrypting, by the computing device the first encrypted data with a second encryption key that is different than the first encrypted key to generate a second encrypted data; and transmitting, by the computing device, the second encrypted data to a second UE.

Example 32 may include the method of example 31, wherein the first encryption key is associated with a user of the second UE or with an application of the second UE and the second encryption key is associated with the user of the second UE or with the application of the second UE.

Example 33 may include the method of example 31, wherein the first encryption key or the second encryption key is a public key that corresponds to a private key associated with the second UE.

Example 34 may include the method of example 33, further comprising re-encrypting, responsive to an indication from a user of the first UE, the user ID with a public key that does not correspond to a private key associated with the remote UE.

Example 35 may include the method of any of examples 31-34, wherein the user ID is a proximity services (ProSe) ID associated with the first UE.

Example 36 may include the one or more non-transitory computer-readable media of any of examples 31-34, wherein the first UE is to identify, from a data transmission based on the transmission of the second encrypted data, the user ID.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A user equipment (UE) comprising:
   receiver circuitry to receive an encrypted broadcast discovery information from a base station (BS), the encrypted broadcast discovery information to include proximity services (ProSe) identity (ID) information of a remote UE; and
   a processor coupled with the receiver circuitry, the processor to:
      select a decryption key from a group of decryption keys consisting of a user-level decryption key and a device level decryption key;
      decrypt the encrypted broadcast discovery information with the selected decryption key to generate a first decrypted broadcast discovery information;
      decrypt the first decrypted broadcast discovery information with an application level decryption key to generate a second decrypted broadcast discovery information; and
      identify, based on the second decrypted broadcast discovery information, the ProSe ID information of the remote UE for device-to-device (D2D) communication.

2. The UE of claim 1, further comprising a transmitter circuitry coupled with the receiver circuitry, the transmitter circuitry to directly transmit a transmission to the remote UE based on the discovery information.

3. The UE of claim 1, wherein the selected decryption key and the application level decryption key are private keys that respectively correspond to public keys.

4. The UE of claim 1, wherein the encrypted broadcast discovery information further comprises a location of the remote UE.

5. The UE of claim 4, wherein the encrypted broadcast discovery information is to allow the UE to identify and communicate with the remote UE in a ProSe network.

6. The UE of claim 1, further comprising a display module coupled with the processor.

7. The UE of claim 1, wherein the UE is a smartphone.

8. A user equipment (UE) comprising:
   receiver circuitry to receive an encrypted broadcast discovery information from a base station (BS), the encrypted broadcast discovery information to include proximity services (ProSe) identity (ID) information of a remote UE; and
   a processor coupled with the receiver circuitry, the processor to: select an application level decryption key;
      decrypt the encrypted broadcast discovery information with the application level decryption key to generate a decrypted broadcast discovery information;
      select an additional decryption key from a group of decryption keys consisting of a user-level decryption key and a device level decryption key;
      decrypt the decrypted broadcast discovery information to generate a double-decrypted broadcast discovery information to obtain the discovery information of the remote UE; and
      identify, based on the double-decrypted broadcast discovery information, the discovery information of the remote UE for device-to-device (D2D) communication.

9. The UE of claim 8, further comprising a transmitter circuitry coupled with the receiver circuitry, the transmitter circuitry to directly transmit a transmission to the remote UE based on the discovery information.

10. The UE of claim 8, wherein the application level decryption key and the additional decryption key are private keys that respectively corresponds to public keys.

11. The UE of claim 8, wherein the discovery information of the remote UE is to allow the UE to identify and communicate with the remote UE in a ProSe network.

12. The UE of claim 8, further comprising a display module coupled with the processor.

13. The UE of claim 8, wherein the UE is a smartphone.

* * * * *